US012160343B2

(12) United States Patent
Vidyashankar et al.

(10) Patent No.: US 12,160,343 B2
(45) Date of Patent: *Dec. 3, 2024

(54) INTEGRITY VERIFICATION FOR MANAGING NETWORK CONFIGURATIONS

(71) Applicant: Cisco Technology, Inc., San Jose, CA (US)

(72) Inventors: Raghavendra Suryanarayana Rao Vidyashankar, Bangalore (IN); Arun Gunasekaran, Bangalore (IN); Padmaraj Ramanoudjam, Puducherry (IN); Om Prakash Suthar, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,107

(22) Filed: Sep. 22, 2023

(65) Prior Publication Data

US 2024/0015066 A1    Jan. 11, 2024

Related U.S. Application Data

(63) Continuation of application No. 17/381,042, filed on Jul. 20, 2021, now Pat. No. 11,818,007, which is a (Continued)

(51) Int. Cl.
*H04L 41/0866* (2022.01)
*H04L 41/0806* (2022.01)
(Continued)

(52) U.S. Cl.
CPC ...... *H04L 41/0866* (2013.01); *H04L 41/0806* (2013.01); *H04L 41/0846* (2013.01);
(Continued)

(58) Field of Classification Search
CPC . H04L 41/08; H04L 41/0803; H04L 41/0806; H04L 41/084; H04L 41/085;
(Continued)

(56) References Cited

U.S. PATENT DOCUMENTS 7,839,891 B1    11/2010   Allan
2008/0288607 A1   11/2008   Muchow
(Continued)

FOREIGN PATENT DOCUMENTS

KR    20190049508 A    5/2019
WO    2017200978 A1    11/2017
(Continued)

OTHER PUBLICATIONS

3GGP: "3rd Generation Partnership Project, Technical Specification Group Services and System Aspects, Procedures for the 5G System, Stage 2 (Release 16)," 3GPP TS 23.502, V16.2.0, 3rd Generation Partnership Project, Mobile Competence Centre, 650, Route Des Lucioles, F-06921 Sophia-Antipolis Cedex, France, Sep. 24, 2019, XP051811144, 530 pages.

(Continued)

*Primary Examiner* — Vivek Srivastava
*Assistant Examiner* — William C McBeth
(74) *Attorney, Agent, or Firm* — Baker Botts L.L.P.

(57) ABSTRACT

In one embodiment, a method includes determining first configuration information for configuring a first user plane device of a first network slice associated with a control plane device, generating a first configuration identifier based on the first configuration information, sending the first configuration identifier and the first configuration information, releasing an association with the first user plane device, receiving a first request to establish the association from the first user plane device comprising a first local configuration identifier, and determining whether the first user plane (Continued)

device is configured using second configuration information by comparing the first local configuration identifier and a second configuration identifier generated based on the second configuration information, where the second configuration information is latest configuration information for the first user plane device.

19 Claims, 15 Drawing Sheets

Related U.S. Application Data continuation of application No. 16/661,958, filed on Oct. 23, 2019, now Pat. No. 11,108,636.

(51) Int. Cl.
*H04L 41/084* (2022.01)
*H04L 41/0869* (2022.01)
*H04L 41/0893* (2022.01)
*H04L 67/00* (2022.01)

(52) U.S. Cl.
CPC ...... *H04L 41/0869* (2013.01); *H04L 41/0893* (2013.01); *H04L 67/34* (2013.01)

(58) Field of Classification Search
CPC ............. H04L 41/0859; H04L 41/0866; H04L 41/0869; H04L 41/0893; H04L 67/34; H04W 4/50
See application file for complete search history.

(56) References Cited

U.S. PATENT DOCUMENTS

| | | | |
|---|---|---|---|
| 2010/0162383 A1 | 6/2010 | Linden et al. | |
| 2010/0169471 A1 | 7/2010 | Allan | |
| 2010/0174807 A1 | 7/2010 | Lyman et al. | |
| 2013/0103836 A1* | 4/2013 | Baniqued | H04L 41/0803 709/226 |
| 2014/0297774 A1 | 10/2014 | Munupalle et al. | |
| 2015/0215165 A1 | 7/2015 | Ohsuga et al. | |
| 2015/0334248 A1 | 11/2015 | Yin et al. | |
| 2016/0241441 A1* | 8/2016 | Jiang | H04L 41/0859 |
| 2016/0291965 A1 | 10/2016 | Li et al. | |
| 2017/0222878 A1 | 8/2017 | Jacquin et al. | |
| 2018/0006870 A1 | 1/2018 | McChord et al. | |
| 2018/0077033 A1 | 3/2018 | Tofighbakhsh et al. | |
| 2018/0097657 A1 | 4/2018 | Dao et al. | |
| 2018/0123961 A1 | 5/2018 | Farmanbar et al. | |
| 2018/0191563 A1 | 7/2018 | Farmanbar et al. | |
| 2018/0199398 A1* | 7/2018 | Dao | H04L 41/0806 |
| 2018/0248792 A1 | 8/2018 | Zhou et al. | |
| 2018/0309818 A1* | 10/2018 | Park | H04L 41/0853 |
| 2018/0359628 A1 | 12/2018 | Breuer et al. | |
| 2019/0124508 A1 | 4/2019 | Watfa et al. | |
| 2019/0149410 A1 | 5/2019 | Araujo et al. | |
| 2019/0166644 A1 | 5/2019 | Shaw et al. | |
| 2019/0166647 A1 | 5/2019 | Velev et al. | |
| 2019/0174573 A1 | 6/2019 | Velev et al. | |
| 2019/0223093 A1 | 7/2019 | Watfa et al. | |
| 2019/0246334 A1 | 8/2019 | Wang et al. | |
| 2019/0254083 A1 | 8/2019 | Stammers et al. | |
| 2019/0280925 A1 | 9/2019 | Cooper | |
| 2019/0327125 A1* | 10/2019 | McChord | H04L 41/0806 |
| 2019/0334769 A1 | 10/2019 | Stamatakis et al. | |
| 2020/0195501 A1 | 6/2020 | Shenoy et al. | |
| 2020/0195511 A1 | 6/2020 | Yang et al. | |
| 2020/0221346 A1 | 7/2020 | Park et al. | |
| 2020/0245163 A1 | 7/2020 | Jaya et al. | |
| 2020/0336894 A1 | 10/2020 | Li et al. | |
| 2020/0344088 A1 | 10/2020 | Selvaraj et al. | |
| 2021/0068172 A1* | 3/2021 | Jeong | H04W 76/12 |
| 2021/0377807 A1 | 12/2021 | Lee | |
| 2021/0385633 A1 | 12/2021 | Wang et al. | |
| 2022/0345532 A1* | 10/2022 | Chandramouli | H04W 76/12 |
| 2023/0239212 A1* | 7/2023 | Haldin | H04L 41/0859 709/220 |

FOREIGN PATENT DOCUMENTS

| | | |
|---|---|---|
| WO | 2018137351 A1 | 8/2018 |
| WO | 2018175974 A1 | 9/2018 |
| WO | 2018236819 A1 | 12/2018 |

OTHER PUBLICATIONS

3GGP: "3rd Generation Partnership Project, Technical Specification Group Services and System Aspects, System Architecture for the 5G System, Stage 2 (Release 16)," 3GPP TS 23.501, V16.2.0, 3rd Generation Partnership Project, Mobile Competence Centre, 650, Route Des Lucioles, F-06921 Sophia-Antipolis Cedex, France, Sep. 23, 2019, XP051839499, 396 pages.

3GPP, "3rd Generation Partnership Project; Technical Specification Group Services and System Aspects; Procedures or the 5G System (5GS); Stage 2 (Release 16)," 3GPP TS 23.502 V16.2.0, Sep. 2019, 525 Pages.

3GPP, "3rd Generation Partnership Project; Technical Specification Group Services and System Aspects; System Architecture for the 5G System (5GS); Stage 2 (Release 16)," 3GPP TS 23.501 V16.2.0 (Sep. 2019), Sep. 2019, 391 pages.

Cao J., et al., "A Survey on Security Aspects for 3GPP 5G Networks." IEEE Communications Surveys Tutorials, 2019, vol. 22, No. 1, pp. 170-195.

International Preliminary Report on Patentability for International Application No. PCT/US2020/055306, mailed May 5, 2022, 11 Pages.

International Search Report and Written Opinion for International Application No. PCT/US2020/055306, mailed Jan. 22, 2021, 17 Pages.

* cited by examiner

INTEGRITY VERIFICATION FOR MANAGING NETWORK CONFIGURATIONS

PRIORITY

This application is a continuation under 35 U.S.C. § 120 of U.S. patent application Ser. No. 17/381,042, filed 20 Jul. 2021, which is a continuation under 35 U.S.C. § 120 of U.S. patent application Ser. No. 16/661,958, filed 23 Oct. 2019, which is incorporated herein by reference.

TECHNICAL FIELD

The present disclosure relates generally to a field of data communications, and more particularly, to managing network configurations between a control plane and a user plane in the data communications network.

BACKGROUND

A distributed architecture of data communications network has been developed in combination with network slicing and edge computing to enrich an end-to-end user experience. For example, in 5th generation core (5GC) networks, gateway control and user function elements are split into physical network nodes. Even though the network nodes are physically separated and possibly positioned apart, the network nodes may still work as a single logical element and share a large set of configurations to ensure the desired user experience.

For example, Control and User Plane Separation (CUPS) of Evolved Packet Core (EPC) provides architectural enhancements for the separation of functionality in the evolved packet core, e.g., EPC's serving gateway (SGW), packet gateway (PGW) and traffic detection function (TDF). CUPS may enable flexible network deployment and operation by distributed or centralized deployment and independent scaling between control plane and user plane functions, while not affecting functionality of existing network nodes subject to being split.

DESCRIPTION OF EXAMPLE EMBODIMENTS

Overview

Figure 1:
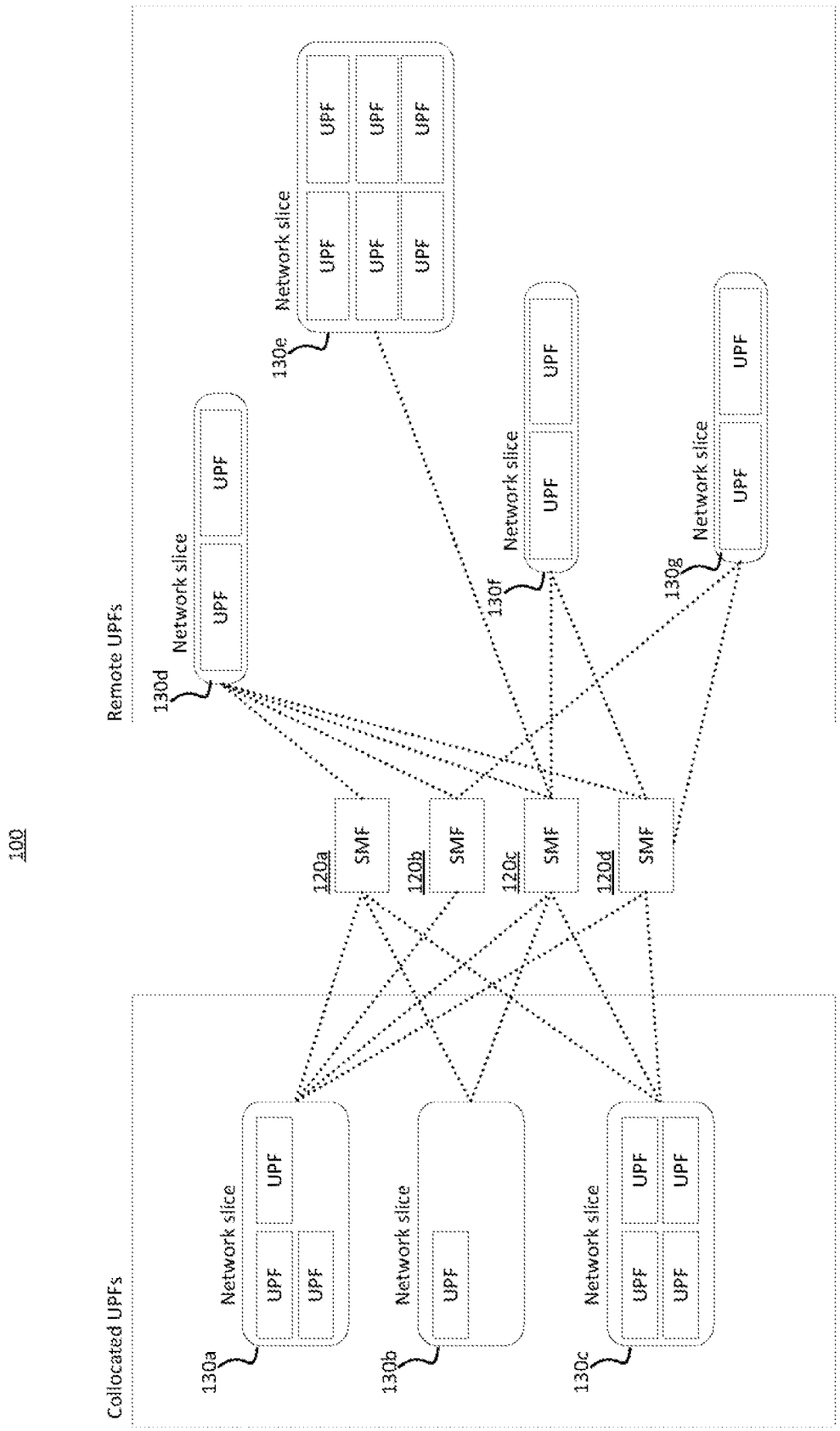
FIG. 1 illustrates an example of an SMF-UPF topology supporting multiple SMFs and multiple network slices.

In one embodiment, a control plane device (e.g., SMF deployed in a control plane of a core network) determines a first configuration information for configuring a user plane device of the first network slice associated with the control plane device. The control plane device generates a first configuration identifier based on the first configuration information and sends, to the user plane device of the first network slice, the first configuration identifier and the first configuration information. When the control plane device receives, from the user plane device of the first network slice, a second configuration identifier, the control plane device verifies that the user plane device of the first network slice is configured using the first configuration information by comparing the first configuration identifier and the second configuration identifier. The control plane device confirms the integrity of configuration information of the user plane device of the first network slice, if second configuration identifier is same as first configuration identifier. Herein, the first configuration identifier is generated to be as a value of hash by computing the first configuration information. The second configuration identifier is generated by the user plane device of the first network slice to be as a value of hash by computing the first configuration information sent from the control plane device.

Example Embodiments 5G standards have established methods for sharing the initial configuration and dynamic synchronization between Session Management Function (SMF) (in the control plane) and User Plane Functions (UPF). However, the standards lack techniques to optimize the configuration provisioning mechanism or audit mechanism to ensure the integrity of the configuration.

As such, a technique for efficiently performing integrity and consistency checks for the configuration information (such as IP pool chunks, ACLs, serving APNs, traffic flow specific policies and rules, etc.) is needed. Such technique is especially needed since there are non-negligible chances of configuration corruption or non-synchronization due to transmission errors or during the software recovery process for the configuration details that would be pushed from SMF to UPF/UPFs of a network-slice.

What is also needed is a technique for efficiently provisioning configuration information to network slices. Currently, an SMF is designed to provision each network slice under the SMF's management with the configuration information of all the network slices managed by that SMF. The SMF does not have an option to provision an UPF with specific configuration information depending on the functionality of the UPF for a particular network slice functionality. As an example, there could be multiple network slices (formed by a single or group of UPFs) that are associated with or served by an SMF, and the UPF/UPFs of each network slice is intended to have different configurations to serve the subscriber sessions. When provisioning configuration information, the SMF would need to send each network slice the configuration information of all network slices served by the SMF. This causes a UPF/UPFs to receive unwanted configuration information that are intended for other UPFs, resulting in the waste of time and message exchanges over the Sx/N4 interfaces.

Another short-comping of existing designs pertains to recovery. When a UPF has to re-associate to SMF due to SMF reload/network outage, the SMF has to push the complete configuration information to the UPF irrespective of current configured status of the UPF. Since configuration information could be large, such transmission causes needless message exchange and delay.

Particular embodiments described herein provide an optimized integrity auditing mechanism to ensure configuration synchronization between a control plane and a user plane. For example, in one embodiment, a control plane device (e.g., SMF deployed in a control plane of a core network) determines a first configuration information for configuring a user plane device of the first network slice associated with the control plane device. The control plane device generates a first configuration identifier based on the first configuration information and sends, to the user plane device of the first network slice, the first configuration identifier and the first configuration information. When the control plane device receives, from the user plane device of the first network slice, a second configuration identifier, the control plane device verifies that the first network slice is configured using the first configuration information by comparing the first configuration identifier and the second configuration identifier. The control plane device confirms the integrity of configuration information of user plane device of the first network slice, if second configuration identifier is same as first configuration identifier. In particular embodiments, the first configuration identifier is a hash value of the first configuration information, generated by the control plane device. Similarly, the second configuration identifier is a hash value, generated by user plane device of the first network slice, of the first configuration information received from the control plane device. Subsequent integrity verification and recovery procedures may also be performed to synchronize the configuration optimized based on the configuration identifiers.

Particular embodiments described herein provides UPF peer-to-peer provisioning to further optimize provisioning operations. For example, in one embodiment, the control plane device (e.g., SMF deployed in a control plane of a core network) determines a first configuration information for configuring a network slice associated with the control plane device and identifies, among a plurality of devices (e.g., user plane functions (UPFs)) within the network slice, a designated device and one or more other devices. The control plane device sends, to the designated device, the first configuration information and sends, to the one or more other devices, a redirection message. In particular embodiments, the redirection message is configured to cause each of the one or more other devices to obtain the first configuration information from the designated device.

As used herein, a session management function (SMF) and a user plane function (UPF) are functional network entities (e.g., devices or apparatuses) of a core network in a service-based network architecture. SMF includes various functionality relating to subscriber sessions. For example, SMF supports session management (session establishment, modification, release), user equipment (UE) IP address allocation & management, DHCP functions, termination of NAS signaling related to session management, DL data notification, and/or traffic steering configuration for UPF for proper traffic routing. UPF supports, for example, packet routing & forwarding, packet inspection, QoS handling. UPF may acts as the external PDU session point of interconnect to Data Network (DN), and may be an anchor point for intra- & inter-RAT mobility.

The term "network slice" refers to a virtual networking architecture in the same family as software-defined networking (SDN) and network functions virtualization (NFV). Network slicing allows multiple virtual networks to be built on a shared physical infrastructure.

The term "heartbeat" is used herein to refer to a periodic status signal generated by hardware or software to indicate normal operation or to synchronize other parts of a computer system. The term "heartbeat protocol" is used herein to refer to negotiating and monitoring the availability of a resource, such as a floating IP address. The "heartbeat message" is used herein to refer to a signal message exchanging between machines at a regular interval.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable non-transitory media containing instructions. One or multiple systems, devices, components, etc., may comprise one or more embodiments, which may include some elements or limitations of a claim being performed by the same or different systems, devices, components, etc. A processing element may be a general processor, a task-specific processor, a core of one or more processors, or other co-located, resource-sharing implementation for performing the corresponding processing. The embodiments described hereinafter embody various aspects and configurations, with the figures illustrating exemplary and non-limiting configurations. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. The term "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1 illustrates an example of an SMF-UPF topology supporting multiple SMFs and multiple network slices. In FIG. 1, SMF-UPF configuration 100 may be formed in a core network (e.g., 5G core network, 5G EPC and so on). Each SMF may support multiple network slices. In FIG. 1, the dotted lines between an SMF and a network slice represents the network slice being supported by the SMF (this relationship may also be referred to as the SMF and network slice being associated with each other). For example, SMF 120a is shown to support or be associated with network slices 130a-d; SMF 120b is shown to support or be associated with network slices 130a, 130d, and 130g; SMF 120c is shown to support or be associated with network slices 130a-c and 130e; and SMF 120d is shown to support or be associated with network slices 130a, 130c-d, and 130f-g. A network slice is formed by a single UPF or a group of UPFs. Some network slices, such as 130a-c, may each have physically collocated UPFs; other network slices, such as 130d-g, may each have remote UPFs that are not collocated. Each network slice could be associated with or served by one or more SMFs.

The UPFs of each network slice may have different PFD (packet flow description) configurations to serve subscriber sessions. Each SMF may establish PFCP association with UPF (or UPFs) by pushing PFD configuration to the UPF/UPFs over a dedicated interface (e.g., Sx/N4 in 5GC). For example, in FIG. 1, network slice 130d is formed by a group of two UPFs and is associated with SMFs 120a-d over a dedicated interface. Each UPF within network slice 130d may be asked by each associated SMF (e.g., SMF 120a) to be configured using the configuration information sent by that SMF. For example, SMF 120a may send to network slice 130d a configuration information that includes specific configuration information for the UPFs in the network slice 130d. Similarly, SMF 120b-d may send respective sets of configuration information to the network slice 130d. The configuration information provisioned to the network slices may specify configuration parameters for things such as IP pool chunks, ACLs, serving APNs, traffic flow specific policies and rules, etc., which are related to identifying attribute and capability for the subscriber PDU session.

Figure 2:
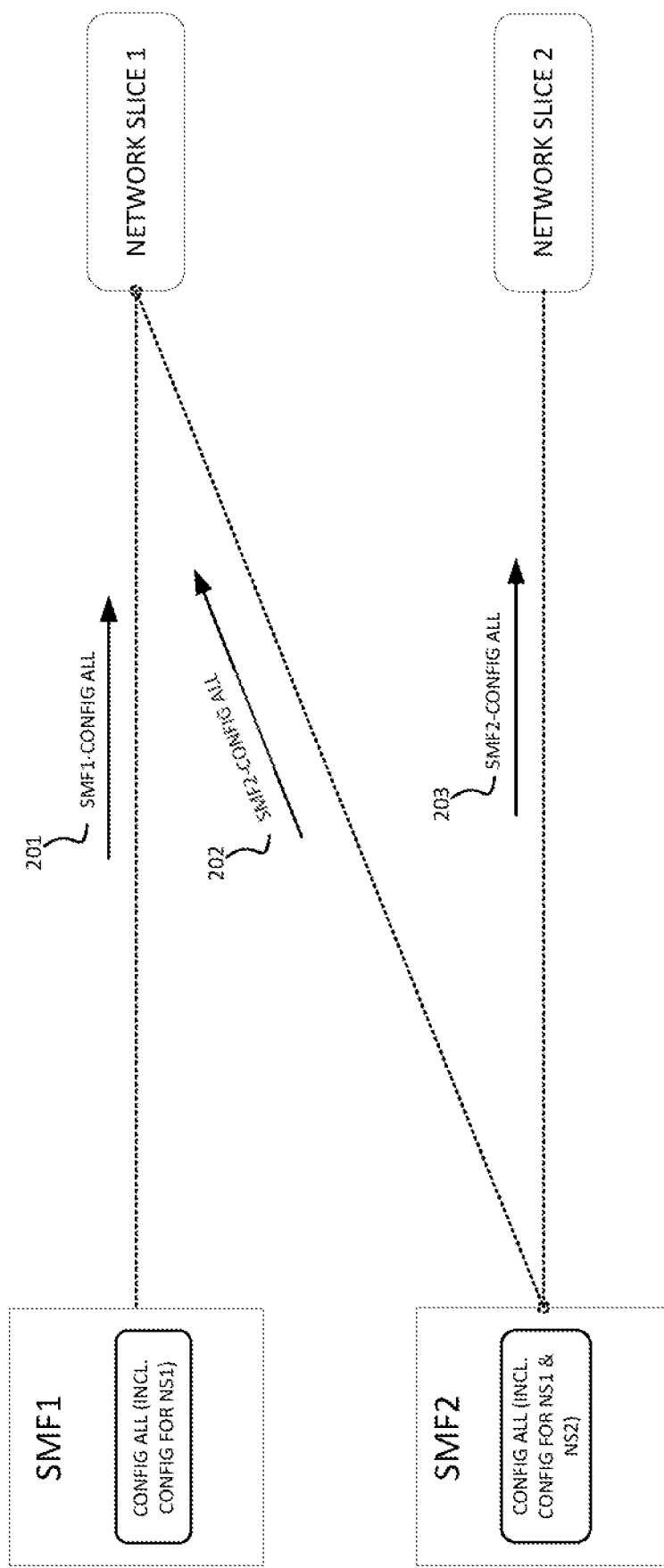
FIG. 2 illustrates an example of a suboptimal process for provision configuration information in an SMF-UPF configuration architecture.

Particular embodiments described herein provide a more efficient way for SMFs to provision configuration information to network slices. FIG. 2 illustrates an example of a suboptimal process for provision configuration information in an SMF-UPF configuration architecture. When establishing PFCP association a SMF may provision a network slice with all the configuration information of all the network slices associated with the SMF. In other words, the SMF would send the same configuration to all the associated network slices, irrespective of the slice or application served. Referring to FIG. 2, since SMF1 is only associated with network slice 1, SMF1 may manage configuration information for network slice 1 only. SMF1 may provision 201 network slice 1 with all the configuration information specified by SMF1 (represented by SMF1-CONFIG ALL in FIG. 2). Since SMF1 is only associated with a single network slice, this provisioning processes is not overly costly. However, the costliness of such a provisioning processes becomes apparent when an SMF services multiple network slices (a common scenario). In FIG. 2, SMF2 is associated with both network slices 1 and 2, and thus SMF2 may manage configurations for both network slices. SMF2 may store the configurations information for network slices 1 and 2 in its computer-readable non-transitory media. When SMF2 provisions 202 configuration information to network slice 1 or provisions 203 configuration information to network slice 2, all the configuration information is sent (SMF2-CONFIG ALL, shown in FIG. 2, represents SMF2's configuration information for both network slice 1 and network slice 2). In this scenario, network slice 1 (and similarly for network slice 2) is receiving not only the configuration information pertaining to it, but also the configuration pertaining to network slice 2. In this case, each network slice (or each UPF within it) would need to determine which configuration information from SMF2 is relevant. As can be seen in this example, the configuration provisioning process shown may result in a waste of resource and bandwidth and does not scale well, especially when the configuration information is large. As such, a more efficient technique is needed to configure network slices.

Figure 3:
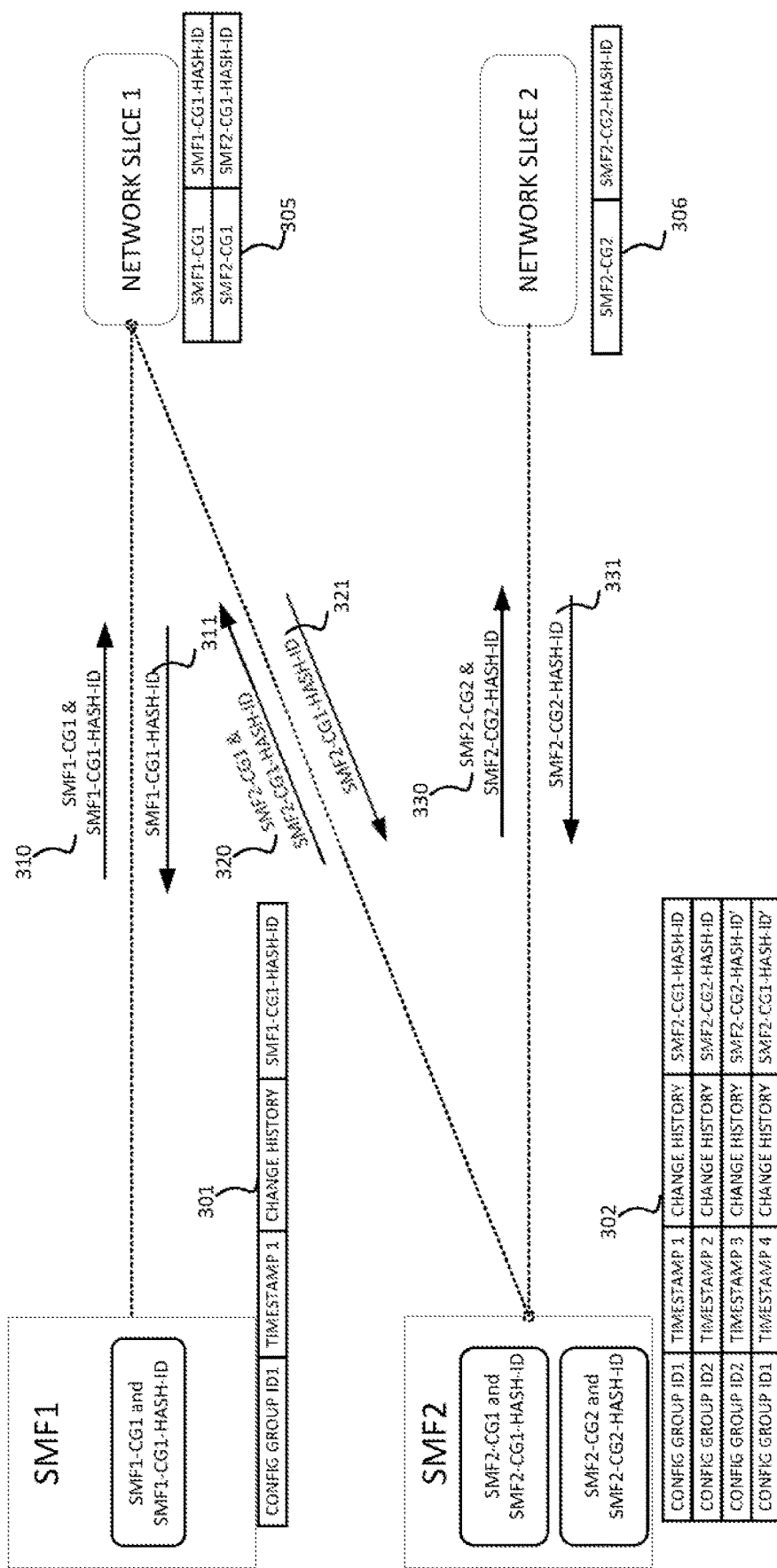
FIG. 3 illustrates an embodiment where each SMF slices configuration information into logical groups for provisioning.

FIG. 3 illustrates an embodiment where each SMF slices configuration information into logical groups based on, e.g., the application or network slice requirements. In an embodiment, each SMF may store a group of configuration information for each network slice managed by that SMF. Unlike the embodiment shown in FIG. 2, FIG. 3 shows that each SMF delineates the configuration information for different network slices, which can conceptually be considered as configuration groups. For example, SMF1 stores the configuration information for network slice 1, which is denoted by SMF1-CG1 in FIG. Since SMF2 is associated with two network slices, it separately stores the configuration information for network slice 1 (SMF2-CG1) and network slice 2 (SMF-CG2). The separation allows the SMFs to provision only the specific configuration information that is relevant to each network slice. For example, as shown in FIG. 3, SMF2 only provisions network slice 1 with SMF2-CG1 and not SMF2-CG2. Similarly, SMF2 only provisions network slice 2 with SMF2-CG2 and not SMF2-CG1. Not provisioning extraneous data helps the network reduce congestion and processing delays.

In particular embodiments, an SMF may generate, for the configuration information of each network slice, a corresponding identifier ("ID") that represents the content of the configuration information. This ID may be used by both the SMF (control plane functions) and UPF (user plane functions) to validate the integrity of the configurations. In particular embodiments, the ID of the configuration information of a particular network slice may be a hash value of the configuration information, generated by any suitable hash algorithm (e.g., MD5, CRC32, etc.). In particular embodiments, the hash algorithm may be applied on the hex bytes of the configuration information, grouped based on several parameters (e.g., application-specific, slice-based, etc.). Both the SMF and UPF of the network slice may use the hash algorithm to generate a hash value for a particular configuration information for a control group. The hash value serves as an encoding of the configuration information. Hash values generated by the hash algorithm may be (1) unique if they are respectively generated from different sets of configuration information, or (2) identical if they are respectively generated from identical sets of configuration information. The ID may be mapped to the specific configuration information for the corresponding network slice. FIG. 3 shows that SMF1 has generated and stored a hash value SMF1-CG1-HASH-ID for the configuration information SMF1-CG1, and SMF2 has generated and stored (1) a hash value SMF2-CG1-HASH-ID for the configuration information SMF2-CG1 and (2) a hash value SMF2-CG2-HASH-ID for the configuration information SMF2-CG2.

An SMF may provision the configuration information and their hash IDs to the network slices associated with the SMF. Each UPF in each network slice may configure itself based on the configuration information from the SMFs. Each network slice may store a record of the configuration information from each SMF. The data may be logically stored as a table and persisted in computer-readable non-transitory media at each UPF of the network. Using FIG. 3 as an example, UPF of network slice 1 stores a table 305 that contains the configuration information SMF1-CG1 and SMF2-CG1 from SMF1 and SMF2, respectively. Similarly, UPF of network slice 2 stores a table 306 that contains the configuration information SMF2-CG2 from SMF2. In particular embodiments, each configuration information entry in the table 305, 306 may also be associated with its corresponding hash ID (e.g., SMF1-CG1-HASH-ID is associated with SMF1-CG1 in table 305). The hash ID stored by each network slice may be locally computed by the UPF of the network slice (e.g., the SMF1-CG1-HASH-ID may be computed by UPF of network slice 1 by applying a hash algorithm to SMF1-CG1). The hash IDs may be used to verify the integrity of the configuration information and ensure that the SMFs and network slices are in synch.

The hash IDs may be used during a configuration process to verify that the configuration information used to configure a network slice is consistent with the configuration information sent by an SMF. In FIG. 3, network slice 1, via transmission 310, may receive configurations information SMF1-CG1 and hash ID SMF1-CG1-HASH-ID from SMF1. UPF of network slice 1 may, in particular embodiments, generate its own local hash ID by applying the hash algorithm to the received SMF1-CG1. By comparing the locally-computed hash ID to the received hash ID, network slice 1 could verify that the received configuration information SMF1-CG1 is not corrupt. Network slice 1 may then transmit 311 the locally computed hash ID back to SMF1 so that SMF1 could compare it with SMF 1's local copy to ensure that network slice 1 configured itself using the correct configuration information SMF1-CG1. In a similar manner, SMF2 and UPF of network slice 2 may verify the integrity of the configuration information based on the hash IDs sent in transmission 320 and 321; and SMF2 and UPF of network slice 2 may verify the integrity of the configuration based on the hash IDs sent in transmissions 330 and 331.

In particular embodiments, each SMF may also track changes in the configurations for its network slices. For example, each time the configuration information provisioned by an SMF changes for a particular network slice, the SMF may log the change (e.g., in a table, list, or any other suitable data structure). FIG. 3 illustrates the tracked changes in tables: SMF1 tracks changes in table 301 and SMF2 tracks changes in table 302. The SMF's tables may include configuration information which comprises, for example, configuration group or network slice identification (e.g., "CONFIG GROUP ID 1" shown in FIG. 3), timestamp, change history (e.g., changes in configuration since the last-stored configuration, updated version number, updated source, time, etc.), hash ID, and any other suitable information. For example, as shown in FIG. 3, SMF1's table 301 has a single entry for the network slice managed by SMF1. This single entry indicates that no changes has been made to the configuration information provisioned by SMF1 to network slice 1. SMF2's hash table has two entries for "CONFIG GROUP ID 1" and two entries for "CONFIG GROUP ID 2." The two entries for "CONFIG GROUP ID 1" or "CONFIG GROUP ID 2" may be associated with different timestamps. If the entries in the hash table are listed in chronological order from top to bottom, the first entry for "CONFIG GROUP ID 1" with timestamp "TIMESTAMP 1" may represent the initial configuration for network slice 1 and the second entry for "CONFIG GROUP ID 1" with timestamp "TIMESTAMP 4" may represent subsequent chances to SMF2's configuration for network slice 1. The second entry at "TIMESTAMP 4" may store changes to the configuration since the first entry at "TIMESTAMP 1." If the configuration has changed, then the hash values associated with the two entries would be different (represented in FIG. 3 by, respectively, SMF2-CFG1-HASH-ID and SMF2-CFG1-HASH-ID'.

As will described in further detail elsewhere herein, when an SMF detects that the configuration information used by a UPF of the network slice does not match the latest configuration information stored in the hash table, the SMF in particular embodiments may send only the difference between the two sets of configuration information to that network slice. In this manner, the SMF could minimize the amount of information sent. In particular embodiments, the SMF may use the hash value received from the network slice and find an entry in the hash table that has a matching hash value. If the entry is not the latest one for that network slice, then the SMF may determine the delta between the latest configuration information and the configuration information associated with that entry, and only send the delta to the UPF of the network slice. Alternatively, in other embodiments, the SMF may send the latest configuration information in its entirety to the network slice.

Figure 4:
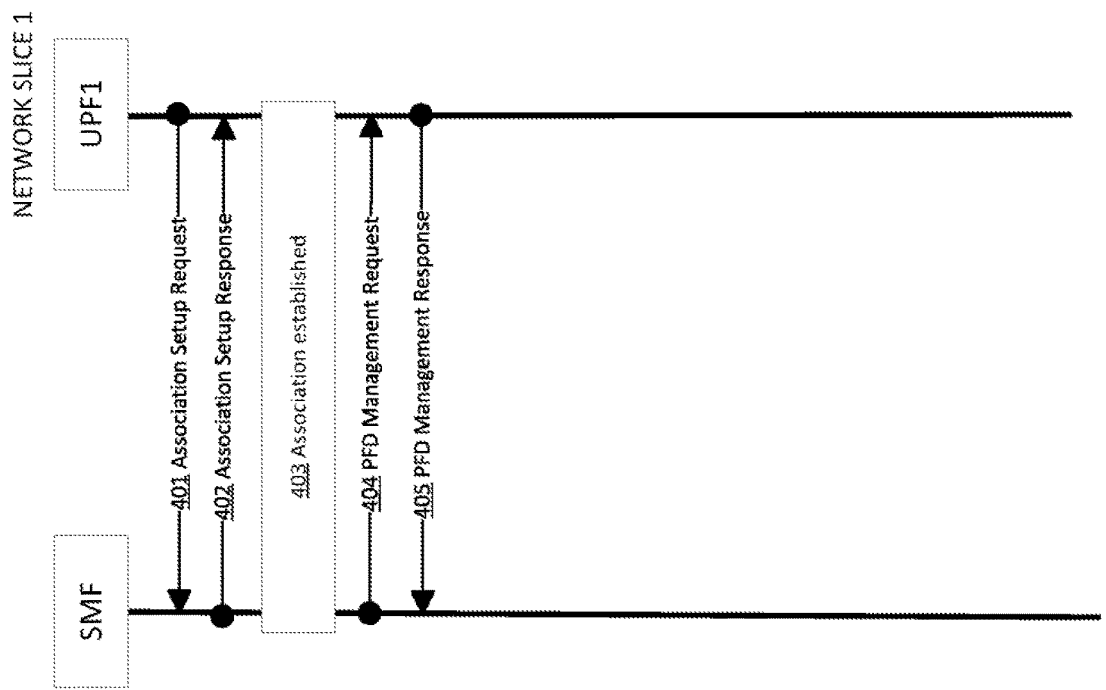
FIG. 4 illustrates an example of a signal flow diagram based on SMF configuration grouping.

FIG. 4 illustrates an example of a signal flow diagram based on SMF configuration grouping. The signal flow shows the SMF establishing associations with and provisioning configuration information to UPF1 of network slice 1 and UPF2 of network slice 2, respectively. SMF may designate network slice 1 as configuration group 1, and network slice 2 as configuration group 2 (e.g., see SMF2 described with reference to FIG. 3). UPF1 of network slice 1 may send, to the SMF, an association setup request message 401, which may include an identifier for network slice 1. The SMF may determine that UPF1 belongs to network slice 1 based on the exchange and send a response message 402. At 403, an association between SMF and UPF1 may be considered to be established. The SMF may identify using the network slice's identifier and send a PFD management request 404 to UPF1. The request 404 may include the configuration information for configuring network slice 1 and a corresponding hash ID (similar to, e.g., transmission 310, 320, or 330 in FIG. 3). The UPF1 may, in response, send a PFD management response 405, which may include the hash ID computed by UPF1 (similar to, e.g., transmission 311, 321, 331, in FIG. 3). As previously discussed, the SMF may then compare the hash ID in response 405 with the hash ID, computed by the SMF, for the latest configuration information. The same process may repeat between the SMF and any number of additional UPFs. After the UPFs have been configured, the hash ID may be used as part of the Keep Alive or Heartbeat message exchanges to ensure the integrity and synchronization of the configuration between the two entities.

Figure 5:
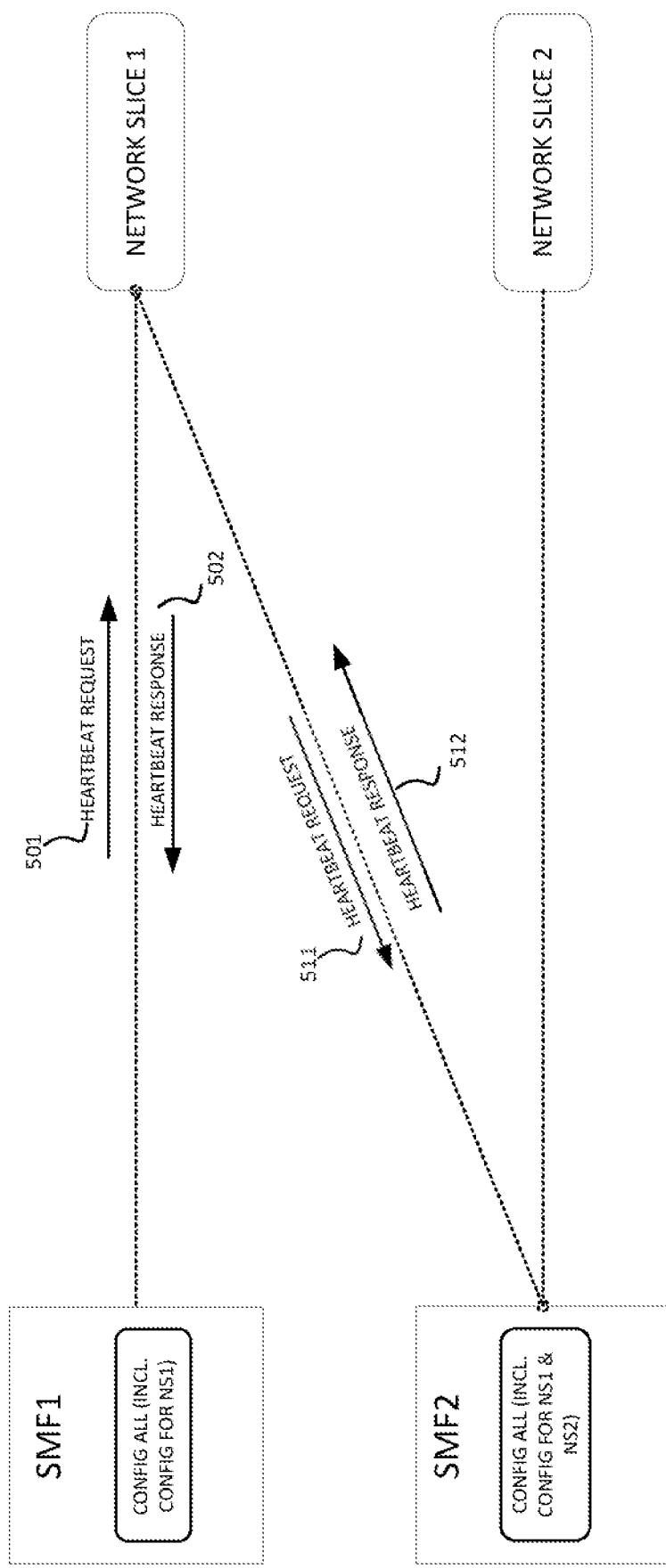
FIG. 5 illustrates an example heartbeat exchange between SMFs and network slices of UPFs.

FIG. 5 illustrates an example heartbeat exchange between SMFs and network slices of UPFs. As shown, heartbeat requests may be initiated by either an SMF or UPF in a network slice. In the example, SMF1 is sending a heartbeat request 501 to the UPF of network slice 1 and receiving a heartbeat response back 502. In the exchange between SMF2 and the UPF of network slice 1, it is the UPF of network slice 1 who initiates the heartbeat request 511 and receives a heartbeat response back 512. In the suboptimal configuration where each SMF does not delineate the configuration information for different network slices, using the heartbeat protocol to verify configuration integrity or consistency can be costly in terms of time, bandwidth, and computations. For example, to perform a configuration audit, either the SMF will need to send the network slice all of its configurations (e.g., SMF2-CONFIG ALL) via a heartbeat request or response (even assuming that the heartbeat request/response could accommodate the amount of data) or the UPF of network slice would need to send its current configuration information to the SMF via a heartbeat request or response. Once either party receives the configuration information, the process of comparing the configuration information with the local copy would require further processing. Thus, an optimized approach for verifying the integrity or synchronization is needed.

Figure 6:
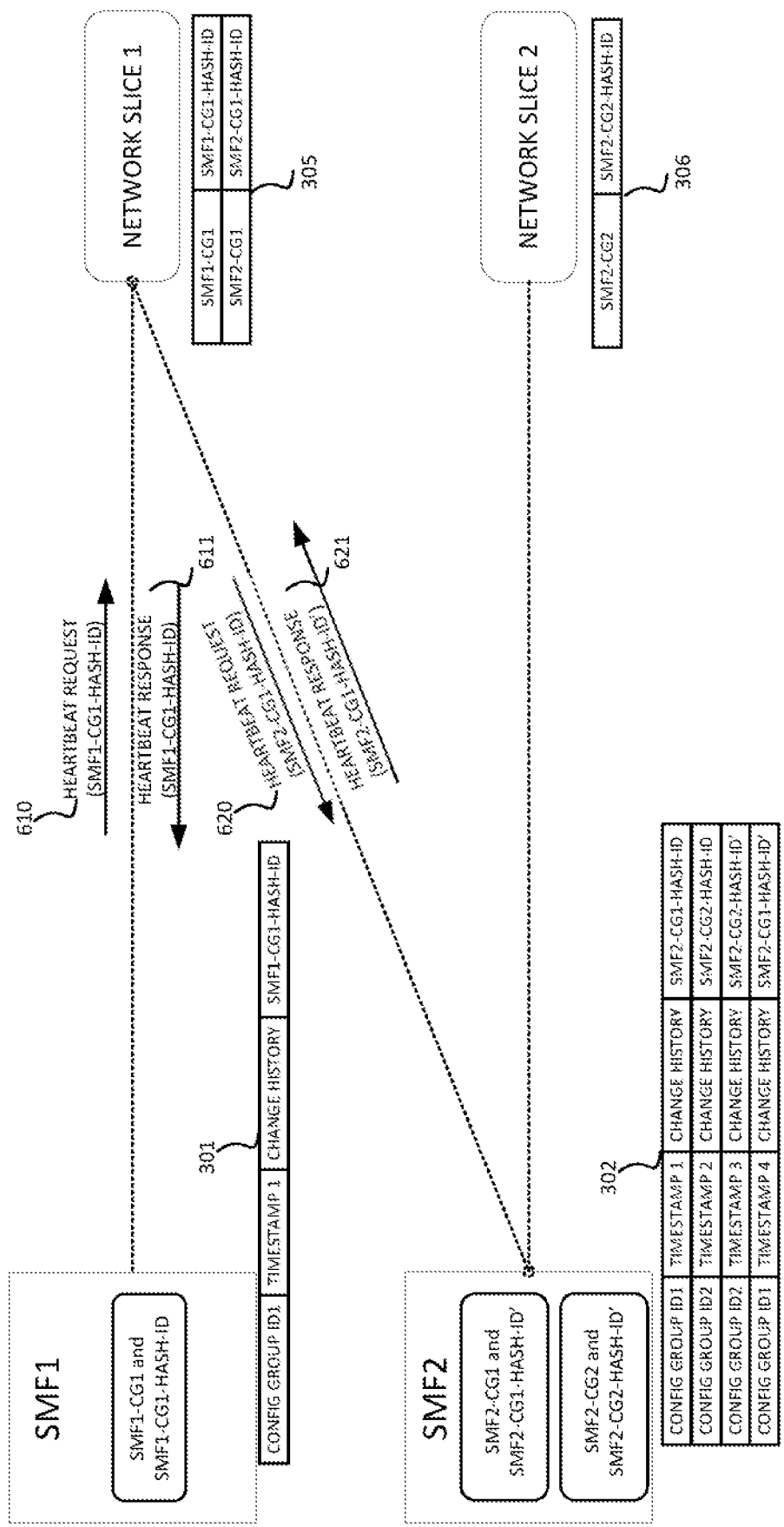
FIG. 6 illustrates an example embodiment for verifying the configuration integrity or synchronization between SMFs and UPFs.

FIG. 6 illustrates an example embodiment for verifying the configuration integrity or synchronization between SMFs and UPFs. SMF1 may periodically provision heartbeat request messages 610 to network slice 1 with the appropriate hash ID (e.g., SMF1-CG1-HASH-ID). Since a hash ID is much smaller than the configuration information from which the hash ID was generated, transmitting the hash ID with a heartbeat request would not put a strain on the network, as was the case in FIG. 5. In response, each UPF of network slice 1 may compare the received hash ID with the locally stored hash ID for SMF1 (e.g., the SMF1-CG1-HASH-ID stored in table 305). A match would indicate that the configurations between the entities are in synch, and a mismatch would indicate that the configuration are out of synch. In particular embodiments, the network slice may send its local hash ID (e.g., SMF1-CG1-HASH-ID) back to SMF1 in a heartbeat response 611. SMF1 may check whether the received hash ID matches its own local hash ID to determine whether the network configuration for network slice 1 is consistent with its own records. This process may also happen in reverse—UPF of the network slice may initiate a heartbeat request 620 with the appropriate hash ID and the SMF may send a heartbeat response 621 with the appropriate hash ID. In either direction, this verification process may allow two network parties of a control plane and a user plane (i.e., SMF and UPF) to efficiently check whether their configurations are in synch. This configuration consistency/integrity check would be very critical especially when there are multi-vendor inter-operability conditions in a 5G network core (e.g., when the SMFs and UPFs deployed in the 5G core are from different vendors, there would be a challenge in ensuring that the right configuration is pushed to an UPF).

In a particular embodiment, when or if either entity detects a mismatch between the hash IDs, the entities may undergo a process to reestablish association. FIG. 6 illustrates an example of this with the heartbeat request 620 from UPF of network slice 1 including a hash ID of SMF2-CG1-HASH-ID, but the current version of the corresponding hash ID stored in table 302 of SMF2 is SMF2-CG1-HASH-ID' (which is also transmitted in the heartbeat response 621). For example, if the current version of the hash ID stored in the SMF's table differs from the hash ID received from a network slice, the SMF may check whether the network slice's hash ID matches one of an older version of the hash IDs associated with that network slice. If so, the SMF may only need to send a delta configuration, rather than the entire configurations stored in the SMF's table, to the network slice. The recovery process will be described in more detail with reference to FIG. 9.

Figure 7:
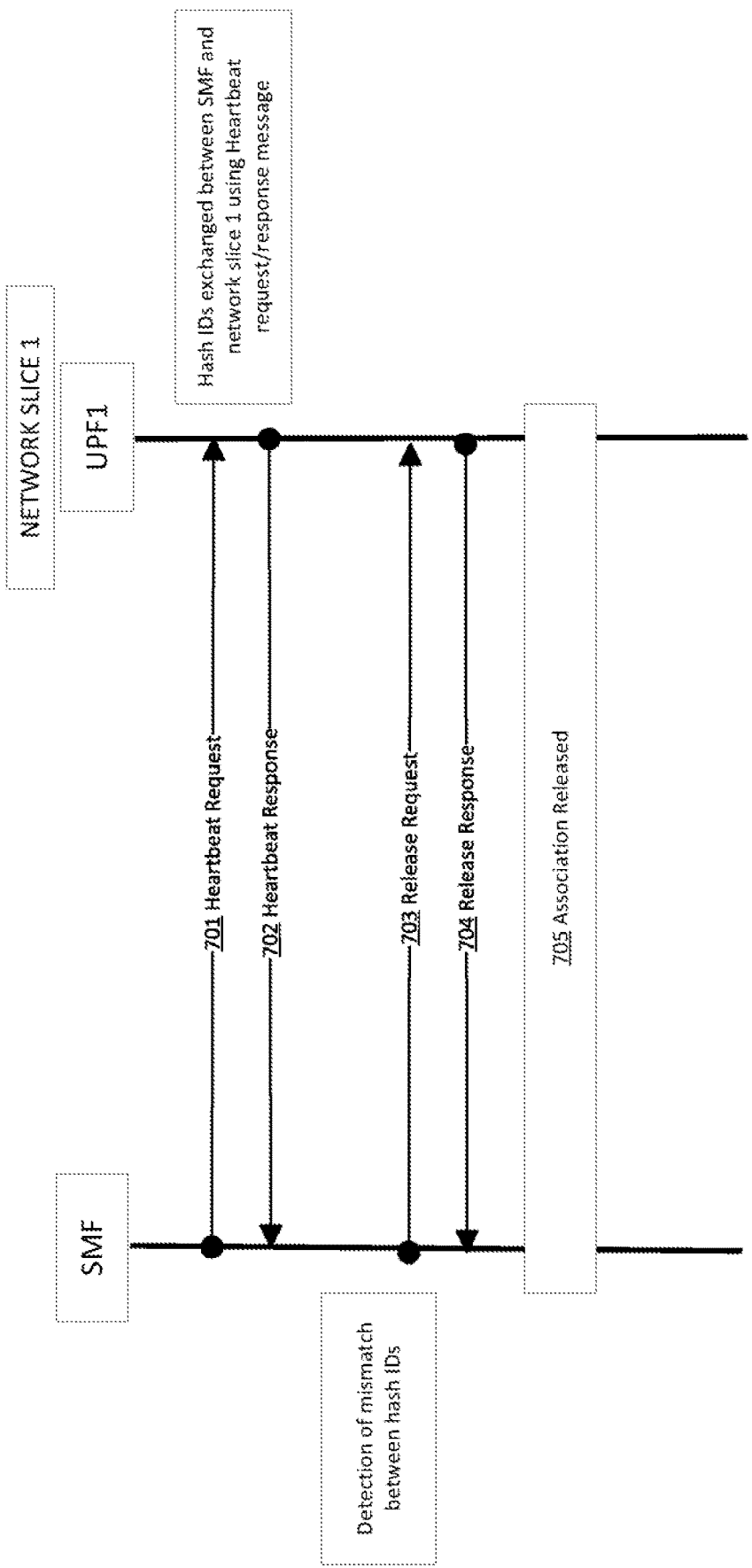
FIG. 7 illustrates an example signal flow for performing a configuration audit between SMFs and UPFs.

FIG. 7 illustrates an example signal flow for performing a configuration audit between SMFs and UPFs. An SMF may send a heartbeat request 701 to UPF1 of network slice 1 to verify whether UPF1 is configured as expected. Similar to the heartbeat request 610 shown in FIG. 6, the heartbeat request 701 may include the appropriate hash ID (e.g., SMF1-CG1-HASH-ID). In response, UPF1 may send the corresponding locally-computed hash ID back in a heartbeat response 702. Through this process, the two entities would exchange their respective hash IDs and are thereby be able to verify whether the hash IDs are consistent. In the event that a mismatch is detected, either entity may request that the association be released. In FIG. 7, SMF initiates the release request 703 and UPF1 responds 704. Thereafter, the association between the two may be considered as being released 705.

Figure 8:
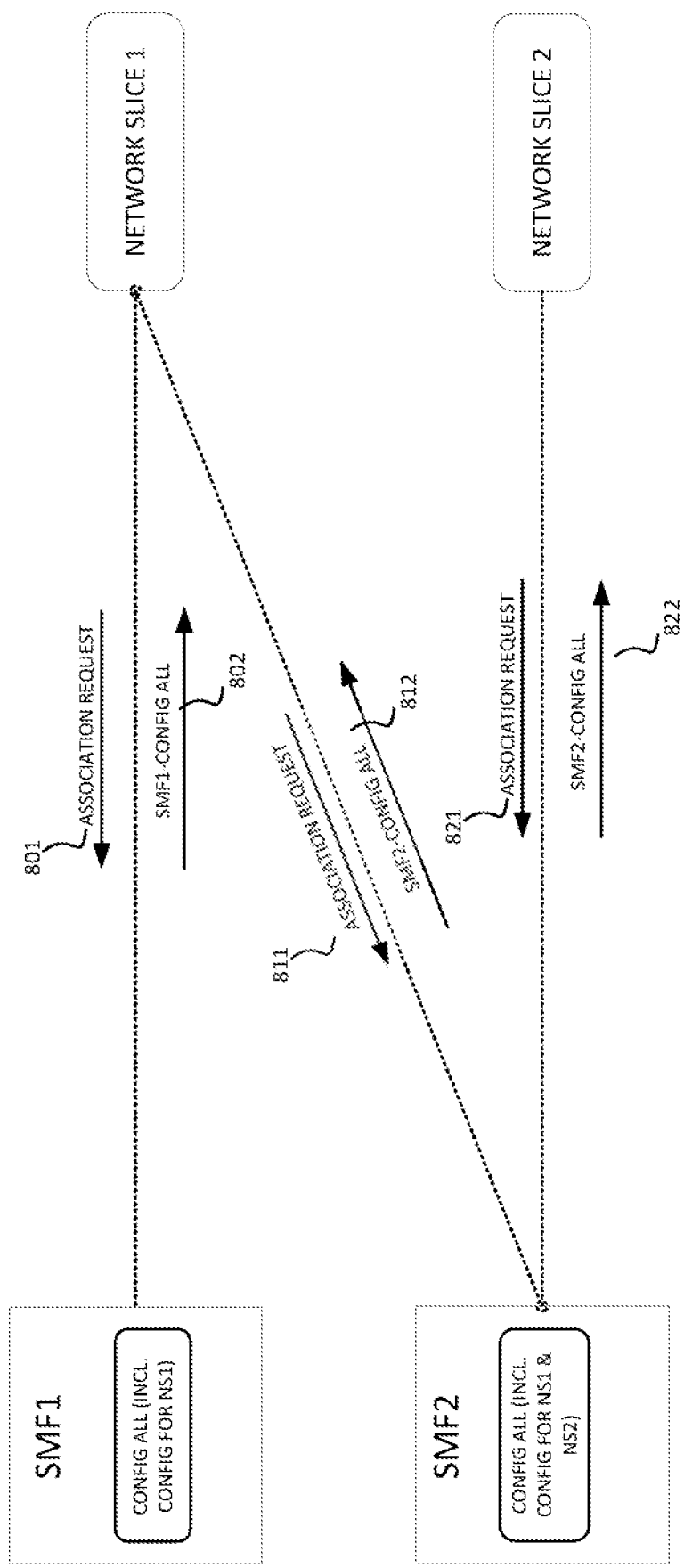
FIG. 8 illustrates a suboptimal recovery procedure where SMFs send complete configuration information irrespective of initial association or re-association scenario.

After an SMF and UPF are no longer associated, which could be due to the discovery of out-of-synch hash IDs or any other reason (e.g., network failure), the UPF may begin a recovery procedure. FIG. 8 illustrates a suboptimal recovery procedure where SMFs send complete configuration information irrespective of initial association or re-association scenario. In the example shown, UPF of network slice 1 may send association requests 801 and 811 to SMF1 and SMF2, respectively. In response, SMF1 may send 802 back the complete configuration information for all the network slices it serves (SMF1-CONFIG ALL) and SMF2 may likewise send SMF2-CONFIG ALL 812. In a similar manner, network slice 2 may send an association request 821 to SMF2 and receive back SMF2-CONFIG ALL 822. Not only is it inefficient for the network slices to receive more configuration information than they needed (e.g., as discussed with reference to FIG. 2, network slice 1 is receiving configuration information pertaining to network slice 2), it is also inefficient in the recovery scenario for the network slices to receive all the configuration information by default irrespective of what the network slices may have retained from the previous association.

Figure 9:
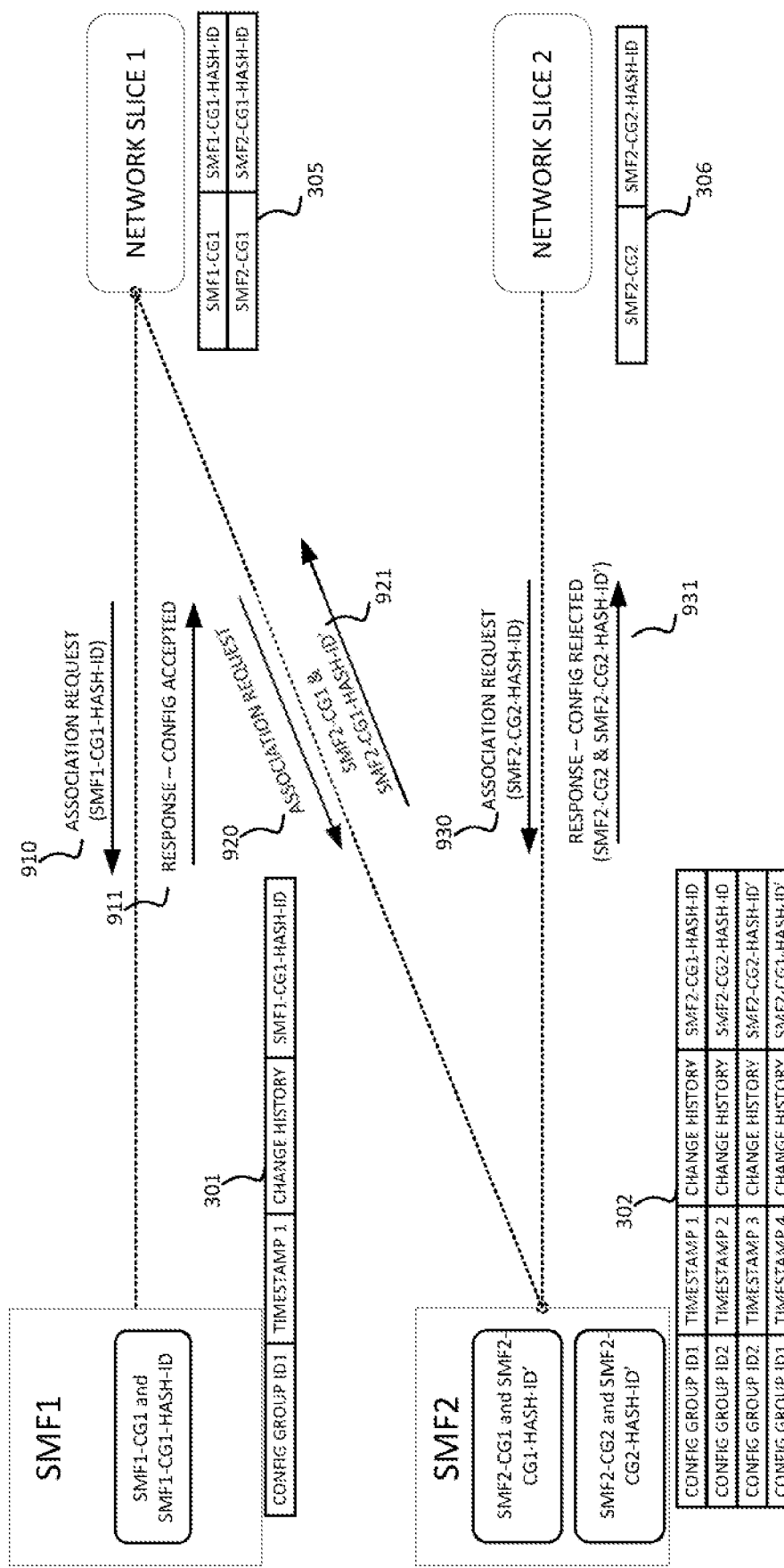
FIG. 9 illustrates an example of an optimized recovery procedure between SMFs and UPFs.

FIG. 9 illustrates an example of an optimized recovery procedure between SMFs and UPFs. As previously discussed, PFD configuration information and corresponding hash IDs may be incrementally stored by SMFs (e.g., SMF1 and SMF2 store such information in tables 301 and 302, respectively). In the event of recovery, UPF may derive the hash ID based on its current configuration information and communicate it to the SMF during the association procedure. For example, FIG. 9 shows network slice 1 sending an association request 910 with the hash ID SMF1-CG1-HASH-ID. SMF1 may determine that this hash ID matches the hash ID of its current version of configuration for network slice 1 and send a response 911 indicating that the configuration is accepted. In that case, no further message exchange is required, which would greatly reduce the network traffic between SMFs and UPFs and reduce recovery time considerably.

In cases where the UPF does not have the hash ID from a previous association or if a hash ID is available but no match is found on the SMF end, then in such worst-case scenario the SMF could provision the complete configuration information for that particular UPF. For example, FIG. 9 shows UPF of network slice 1 sending an association request 920 without a hash ID (or if a hash ID is provided, it may not match any of the hash IDs stored by SMF2 in table 302). In this case, SMF2 would respond 921 with the complete current configuration SMF2-CG1 for network slice 1. In the example shown, the current version has a hash ID of SMF2-CG1-HASH-ID' (updated at TIMESTAMP 4), which would be included in the response 921.

Even if a hash ID in an association request does not match the current hash ID stored by the SMF, it may nevertheless match one of the prior versions stored. For example, network slice 2 may send an association request 930 with the hash ID SMF2-CG2-HASH-ID. Upon receiving the hash ID, SMF2 may determine that it does not match the current version of the hash ID, SMF2-CG2-HASH-ID', stored at TIMESTAMP 3. However, the hash ID in the association request 930 matches the hash ID of the previous version that was stored at TIMESTAMP 2. Thus, SMF2 may determine the delta or change history between the two versions at TIMESTAMP 2 and TIMESTAMP 3, since SMF2 may assume that network slice 2 still have the old configuration at TIMESTAMP 2. So instead of sending the complete configuration information for network slice 2, SMF2 could send network slice 2 a response 931 with just the delta or change made since TIMESTAMP 2, along with the current hash ID SMF2-CG2-HASH-ID'.

Figure 10:
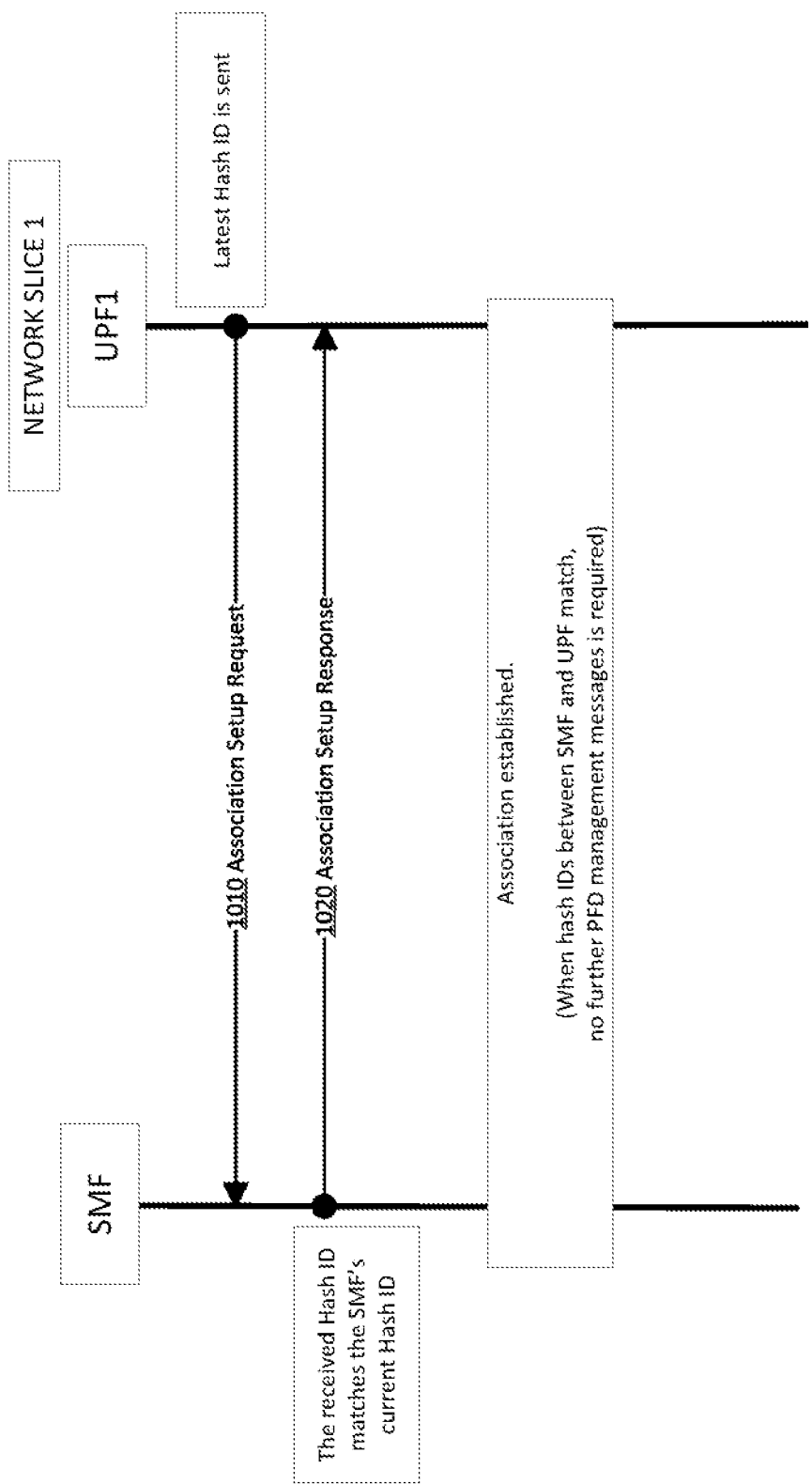
FIG. 10 illustrates an example of a signal flow for recovering network configuration of UPF in the event the UPF's hash ID matches the current hash ID of the SMF.

FIG. 10 illustrates an example of a signal flow for recovering network configuration of UPF in the event the UPF's hash ID matches the current hash ID of the SMF. During recovery, UPF1 of network slice 1 may trigger an association setup request message 1010 to be sent to the SMF. The association setup request message 1010 may include the latest hash ID for the network slice 1. The latest hash ID may be stored in UPF's table (e.g., table 305 or 306). Alternatively, the latest hash ID may be computed based on the current configuration of the UPF1. Upon receiving the request 1010, the SMF may check whether the hash ID received from the UPF1 exists in the SMF's table (e.g., table 301 or 302). If the received hash ID matches the current hash ID of the SMF (e.g., in FIG. 9, the SMF1-CG1-HASH-ID sent in message 910 matches the current hash ID in table 301), the SMF may send an association setup response message 1020 back to the UPF without sending any configuration information. Since the SMF has verified that the UPF1's configuration is up-to-date, the recovery process may end.

Figure 11:
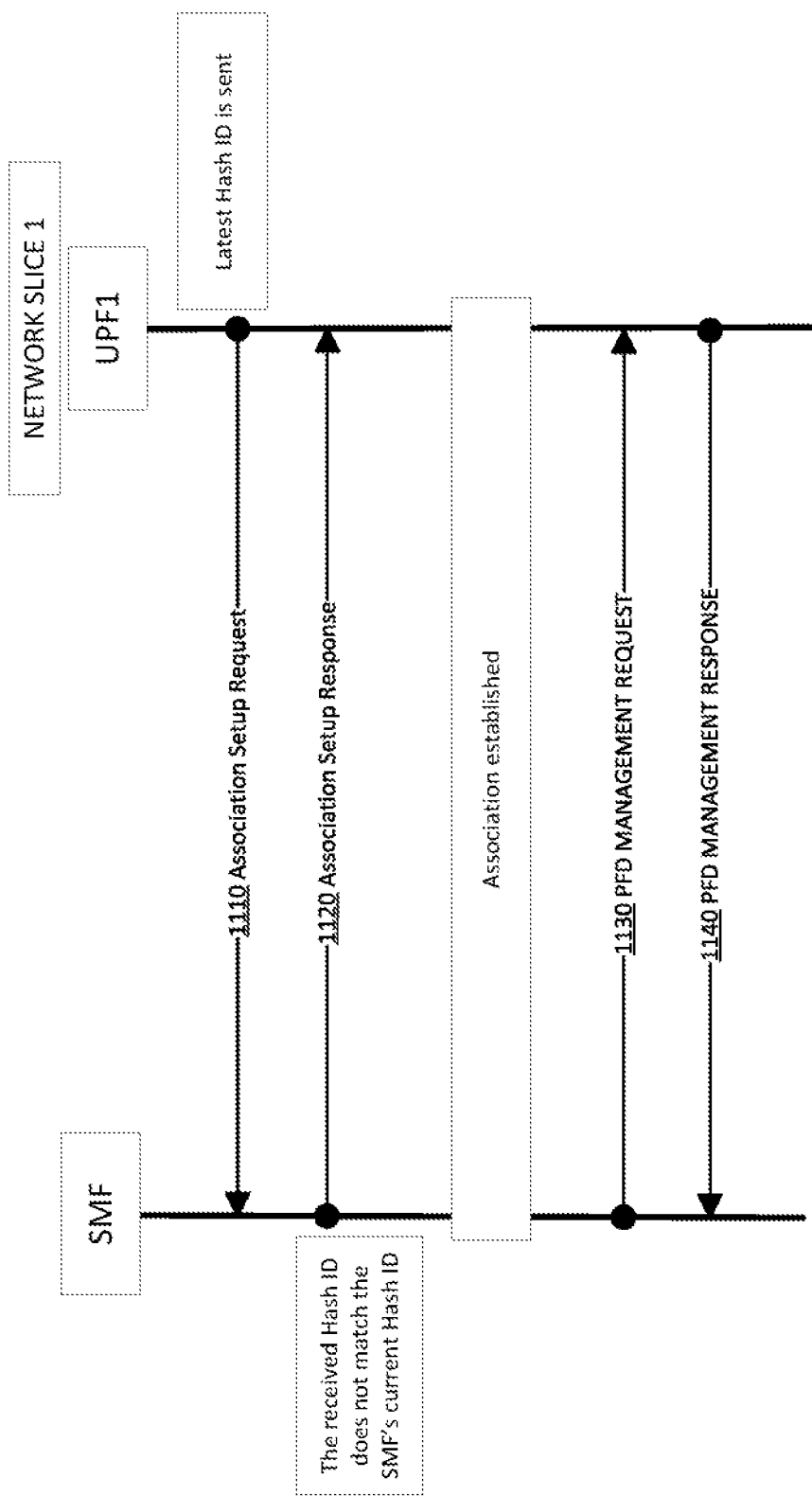
FIG. 11 illustrates another example of a signal flow for recovering network configuration of UPF in the event the UPF's hash ID does not match the current hash ID of the SMF.

FIG. 11 illustrates another example of a signal flow for recovering network configuration of UPF in the event the UPF's hash ID does not match the current hash ID of the SMF. During recovery, UPF1 of network slice 1 may trigger an association setup request message 1110 to be sent to the SMF. The association setup request message 1110 may include the latest hash ID for the UPF1 of network slice 1. The latest hash ID may be stored in UPF's table (e.g., table 305 or 306). Alternatively, the latest hash ID may be computed based on the current configuration of the UPF1. Upon receiving the request 1110, the SMF may check whether the hash ID received from the UPF1 exists in the SMF's table (e.g., table 301 or 302). If the hash ID in the request 1110 does not exist in the SMF's table or record of current and past hash IDs, the SMF may send an association setup response message 1120 to the UPF to complete establishment of the association. In addition, the SMF may provision the UPF1 with the necessary configuration information to help it recover. As previously discussed, the configuration information may be provisioned via PFD management messages 1130, which includes the necessary configuration information and the corresponding hash ID. In particular embodiments, the SMF might not need to send the entire current configuration information for UPF of network slice 1. Instead, the SMF may use the hash ID received in the request 1110 to find a corresponding record in its table of change histories. Using FIG. 9 as an example, if SMF2 receives a request 1110 that includes SMF2-CG2-HASH-ID, SMF2 would find a matching hash ID in its table 302 with TIMESTAMP 2. SMF2 may then compare the configuration for CONFIG GROUP ID 2 at TIMESTAMP 2 to the latest configuration for CONFIG GROUP ID 2 at TIMESTAMP 3 to find the delta. Then, SMF2 would only need to send the delta in the PFD management request 1130 instead of the entire current configuration for CONFIG GROUP ID 2. In the event that no historic entry in the table matches the hash ID in the request 1110 (or if the delta cannot be computed), SMF2 could send the entire current configuration for CONFIG GROUP ID 2 to the UPF.

Figure 12A:
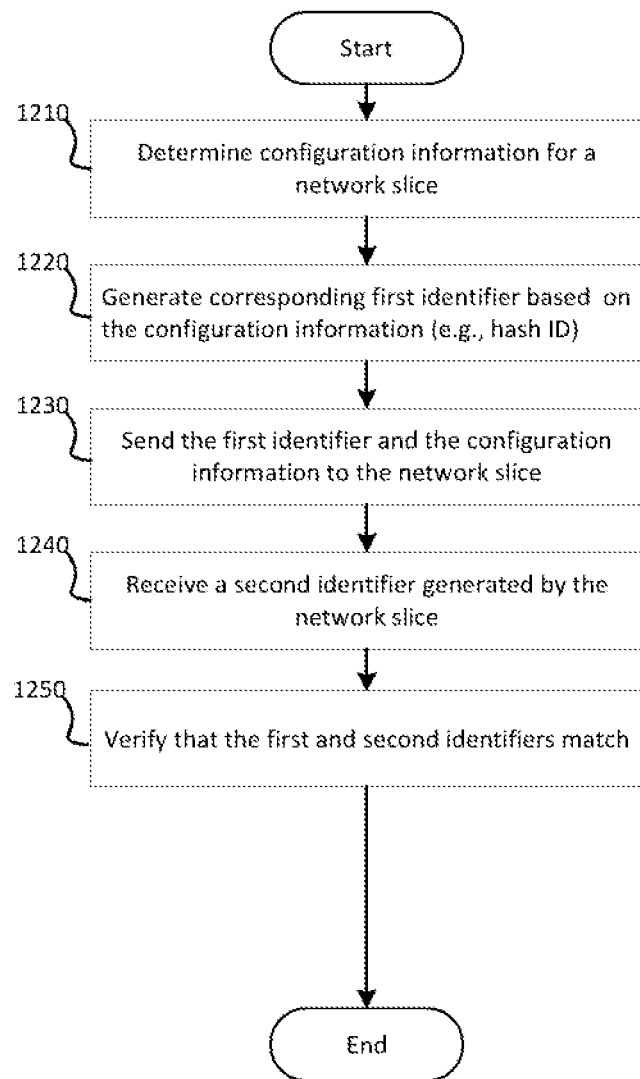
FIG. 12A illustrates an example of a flow chart for network configuration.

FIG. 12A illustrates an example of a flow chart for network configuration. The method may be performed by a control plane device (e.g., SMF) configured to perform a system management function in a network (e.g., 5G core). In an embodiment where the SMF device may be configuring a network slice with one or more UPFs, the device may, at step 1210, determine a first configuration information (e.g., SMF2-CG1) for configuring a UPF of first network slice associated with the control plane device. At 1220, the device may generate a first configuration identifier based on the first configuration information. In particular embodiments, the first configuration identifier (e.g., SMF2-CG1-HASH-ID) is generated by processing the first configuration information using a hash algorithm. At step 1230, the device may send, to the first network slice, the first configuration identifier and the first configuration information. The first configuration identifier sent to the first network slice may be configured to be used by the first network slice to verify the first configuration information received from the control plane device (e.g., verify the integrity of the first configuration information or whether the received version is corrupt). At 1240, the device may receive, from the UPF of first network slice, a second configuration identifier that is generated by the UPF of first network slice based on the first configuration information received from the control plane device. The hash algorithm used by the UPF of first network slice to generate the second configuration identifier may be the same hash algorithm used by the device to generate the first configuration identifier. At 1250, the control plane device may verify, by comparing the first configuration identifier and the second configuration identifier, that the UPF of first network slice is configured using the first configuration information. The above process may be used by the device to further configure UPFs of other network slices. For example, if the device further manages a second network slice, the device may determine a second configuration information for configuring a second network slice. The second configuration information may be different from the first configuration information. The device may then send, to the second network slice, the second configuration information and a corresponding configuration identifier.

Figure 12B:
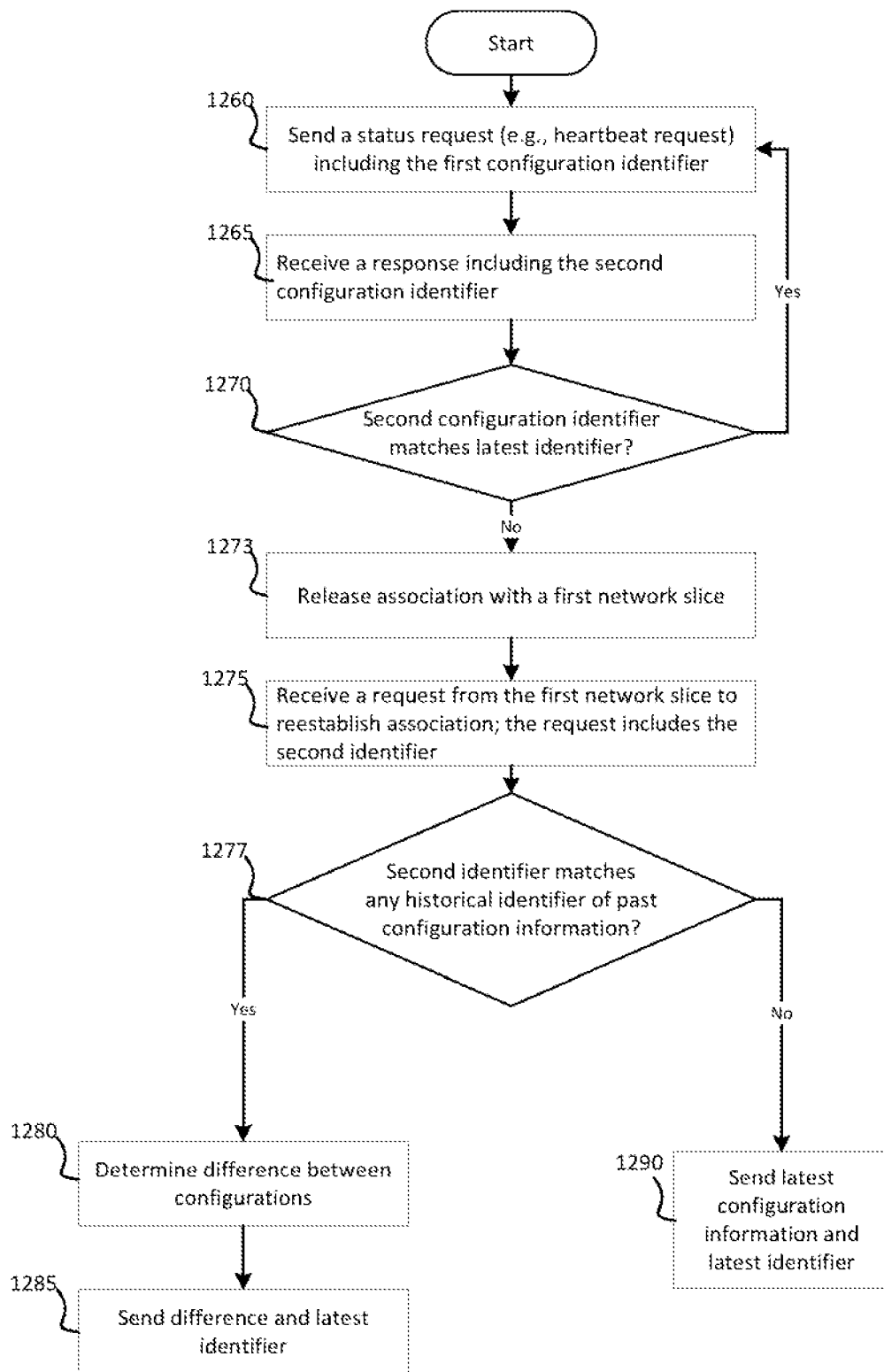
FIG. 12B illustrates an example of a flow chart for verifying the integrity or synchronization between SMFs and UPFs.

FIG. 12B illustrates an example of a flow chart for verifying the integrity or synchronization between SMFs and UPFs. The method may begin with a control plane device (SMF) sending, at step 1260, a status request (e.g., via a heartbeat protocol) comprising the first configuration identifier to the first network slice. At step 1265, the device may receive, from the UPF of the first network slice, a status response comprising the second configuration identifier. At step 1270, the device may verify whether the second configuration identifier matches the latest configuration identifier for the first network slice (e.g. verifying whether it is up-to-date). If there is a match, the process may repeat at 1260 so that the device would periodically verify whether the UPF of the first network slice is in synch. If there is a mismatch, then the device may, at step 1273, release the association with the first network slice. Then at step 1275, the device may receive, from the UPF of the first network slice, a request to establish association, the request comprising the second configuration identifier. At step 1277, the device may check whether the second identifier is found in a record of configuration identifiers associated with the first network slice. If the second configuration identifier matches the first configuration identifier in the record but the first configuration identifier is not the latest, then at step 1280 the device may determine a difference between the first configuration information corresponding to the first configuration identifier and a latest configuration information corresponding to the latest configuration identifier. Then at step 1285, the device may send, to the first network slice, configuration information corresponding to the difference. On the other hand, if the device at step 1277 determined that the second configuration identifier fails to match any of the configuration identifiers in the record (e.g., in this case, either the first configuration identifier may not have been recorded in the record, or the configuration identifier received in step 1275 may be an unknown new identifier), the device may send, to the UPF of the first network slice, a latest configuration identifier in the record of configuration identifiers and a corresponding latest configuration information.

Figure 13:
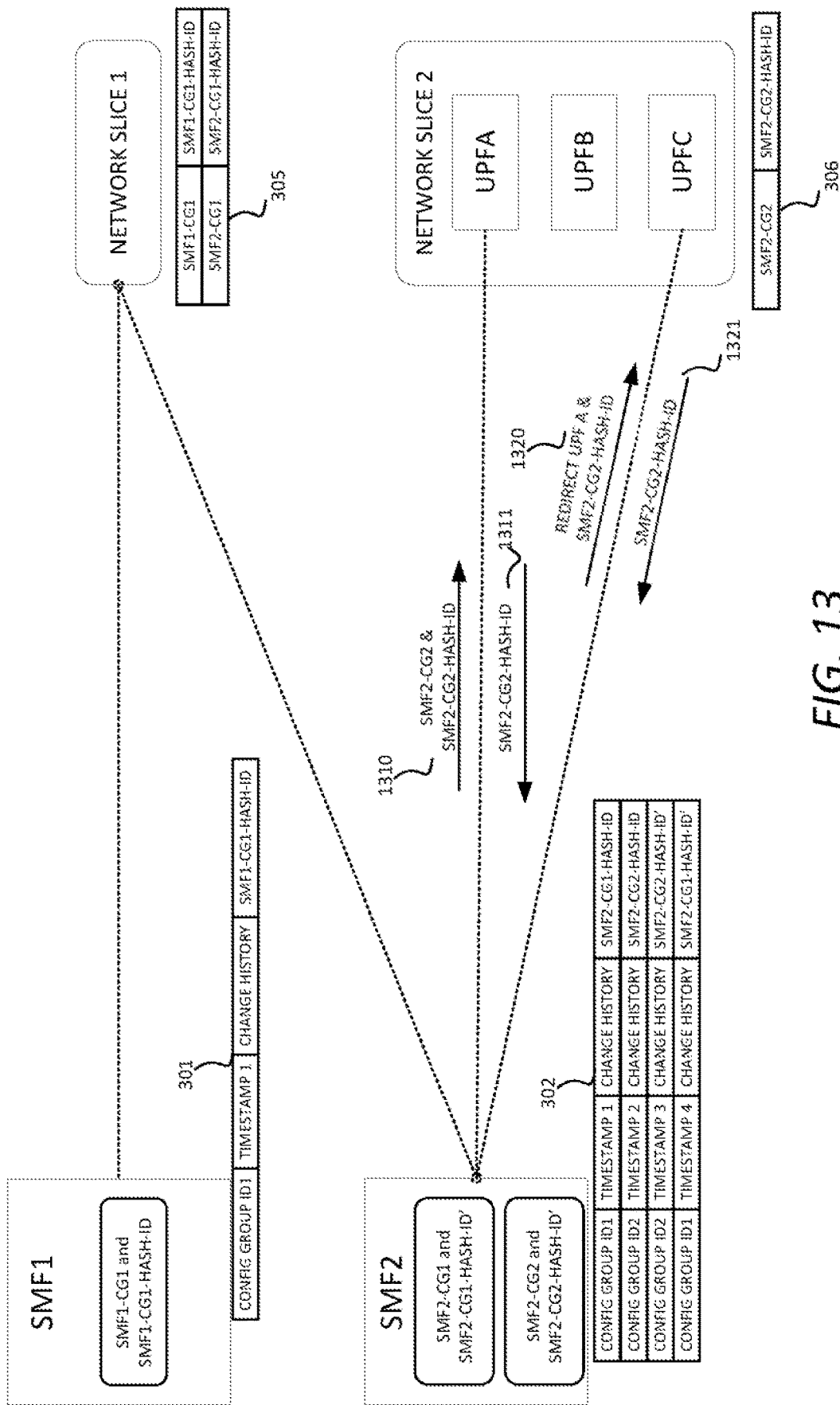
FIG. 13 illustrates an example of peer-to-peer provisioning of network configurations in UPF(s) of a network slice.

FIG. 13 illustrates an example of peer-to-peer provisioning of network configurations in UPF(s) of a network slice. Here, network slice 2 includes UPF A, UPF B, and UPF C. UPFs A, B, and C are associated with SMF2 and are configured based on the configuration information provisioned by SMF2. In particular embodiments, a specific UPF in a network slice could be designated as a master among multiple UPFs belonging to the network slice. The specific UPF (i.e., the master UPF) may have the responsibility of communicating with the SMF to update and store the configuration information (or UPF's table) for the network slice. Such a configuration helps reduce traffic exchanged between the SMF and each UPF within the network slice. For example, instead of sending the lengthy configuration information to each UPF within the network slice, the SMF would only need to send it to the master UPF and have the other UPFs obtain the configuration information from the master UPF. The master UPF may be designated by the SMF or another network entity (e.g., by the UPFs within the network slice).

Referring to FIG. 13, UPF A within network slice 2 may be designated as a master UPF. SMF2 may directly communicate with the master UPF (i.e., UPF A) and all the other UPFs (i.e., UPFs B and C). SMF2 is shown to communicate 1310 the configuration information for network slice 2 (e.g., SMF2-CG2) and the corresponding hash ID (e.g., SMF2-CG2-HASH-ID) to only the master UPF A. As previously discussed, UPF A may compute its own hash ID and send it back in a response message 1311. The configuration information stored by UPF A may be shared with the other UPFs within the network slice. In particular embodiments, SMF2 may directly of 22 communicate with one of the non-master UPFs to inform it of where the configuration could be obtained. For example, SMF2 may send a message 1320 to UPF C to inform it that the configuration information may be obtained from UPF A. The message 1320 may also include the hash ID of the configuration information so that UPF C could independently verify the integrity of the configuration information obtained from UPF A. For example, once UPF C obtains the configuration information from UPF A, it could locally compute a corresponding hash ID and compare it with the one received in message 1320 to verify the configuration information. Thereafter, UPF C may send the locally-computed hash ID in a response 1321 to SMF2, as previously discussed. For heartbeat verifications, each UPF may communicate with the SMF, rather than the master UPF, to check whether its hash ID and configuration information are up-to-date. A network interface (e.g., N4' interface protocol such as PFCP) may be used by the UPFs within the network slice to communicate with each other.

Figure 14:
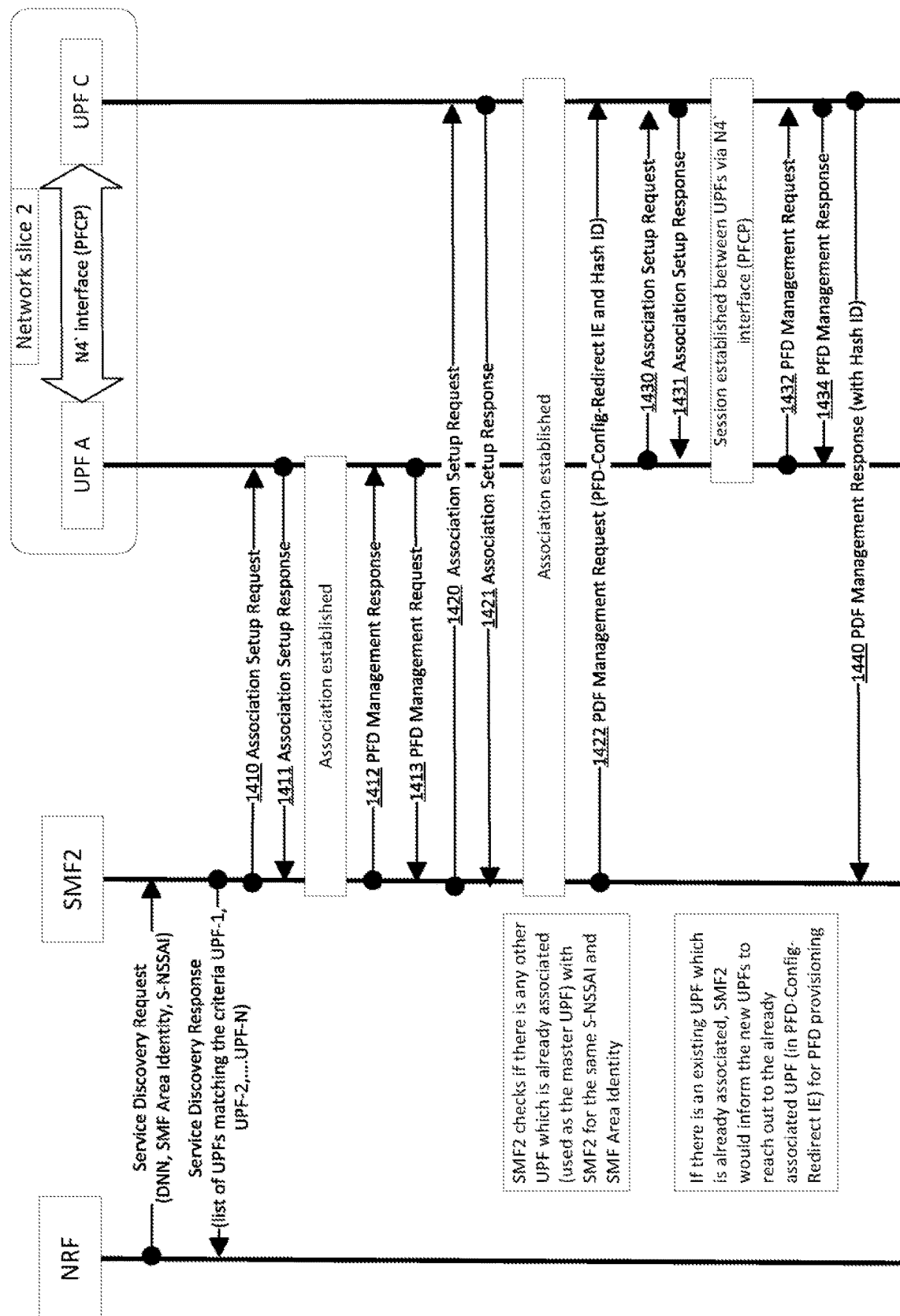
FIG. 14 illustrates an example of a signal flow for peer-to-peer provisioning of network configurations in UPF(s) within a network slice.

FIG. 14 illustrates an example of a signal flow for peer-to-peer provisioning of network configurations in UPF(s) within a network slice. In the example shown, SMF2 may determine, among a plurality of UPFs A and C within network slice 2, master UPF A and slave UPF C. After establishing a first association with UPF A by exchanging association setup messages (1410 and 1411), SMF2 may designate UPF A as the master. SMF2 may send, to master UPF A, the configuration information for network slice 2 through, for example, a PFD management request message (1412). Master UPF A may store the received configuration information in its own storage and send back a response (1413).

After SMF2 has designated UPF A as the master, subsequent associations with other UPFs may be treated as slaves. For example, SMF2 may establish a second association with UPF C by exchanging association setup messages (1420 and 1421). Based on the exchange, SMF2 may check whether a master UPF has already been selected for the same network slice (e.g., based on the same S-NSSAI and SMF Area Identity). Since UPF A is already designated as the master in the example shown, SMF2 may send a redirection message to instruct UPF C to obtain the configuration information for network slice 2 from master UPF A (1422). The redirection message may include identification information for master UPF A, which can be used by UPF C in establishing the association with master UPF A. UPF C may establish the association with master UPF A by exchanging association messages (1430 and 1431). Master UPF A may send the configuration information for network slice 2 stored therein through, for example, a PFD management request message (1432). The PFD management request message may include a hash ID of network slice 2, which is generated, by master UPF A. In an embodiment, UPF C may generate the hash ID of network slice 2 by computing the configuration information received from master UPF A. For integrity checks, UPF C may send the hash ID of network slice 2 to SMF2 in a PDF management response to complete the PDF management exchange (1440).

In particular embodiments, a computer system comprising one or more processors may include hardware, software, or both providing one or more communication interfaces (e.g., Sx/N) for communication (such as, for example, packet-based communication) between control plane devices and one or more user plane devices. As an example and not by way of limitation, communication interface of system may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, the computer system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The computer system may include any suitable communication interface for any of these networks, where appropriate. The communication interface may include one or more communication interfaces, where appropriate. Although this disclosure describes and illustrates a particular communication interface, this disclosure contemplates any suitable communication interface.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for managing network configurations comprising, by a control plane device:
   determining first configuration information for configuring a first user plane device of a first network slice associated with the control plane device;
   generating a first configuration identifier based on the first configuration information;
   sending, to the first user plane device of the first network slice, the first configuration identifier and the first configuration information;
   releasing an association with the first user plane device;
   receiving, from the first user plane device, a first request to establish the association, the first request comprising a first local configuration identifier that is generated by the first user plane device based on first local configuration information used for configuring the first user plane device;
   determining whether the first user plane device is configured using second configuration information by comparing the first local configuration identifier and a second configuration identifier generated based on the second configuration information, wherein the second configuration information is latest configuration information for the first user plane device;
   sending, to the first user plane device, a heartbeat request message including the second configuration identifier;
   receiving, from the first user plane device, a heartbeat response message including a second local configuration identifier that is generated by the first user plane device based on the first local configuration information used for configuring the first user plane device; and
   determining whether the first user plane device is configured using the second configuration information by comparing the second local configuration identifier and the second configuration identifier.

2. The method of claim 1, further comprising:
   determining that the first local configuration identifier matches the second configuration identifier, wherein the second configuration identifier is identical to the first configuration identifier; and
   establishing the association with the first user plane device.

3. The method of claim 2, further comprising:
receiving, from the first user plane device, a status request comprising the first local configuration identifier;
verifying that the first local configuration identifier matches the second configuration identifier; and
sending, to the first user plane device, a status response comprising the second configuration identifier.

4. The method of claim 2, further comprising:
releasing the association with the first user plane device;
receiving, from the first user plane device, a second request to establish the association, the second request comprising a second local configuration identifier;
accessing records of configuration identifiers associated with the first network slice;
determining that the second local configuration identifier fails to match any configuration identifier in the records; and
sending, to the first user plane device of the first network slice, third configuration information and a third configuration identifier generated based on the third configuration information, wherein the third configuration information is latest configuration information for the first user plane device when sending the third configuration information to the first user plane device of the first network slice.

5. The method of claim 1, further comprising:
determining that the first local configuration identifier and the second configuration identifier are different, the second configuration identifier being different from and subsequent to the first configuration identifier; and
sending, to the first user plane device of the first network slice, the second configuration identifier.

6. The method of claim 5, further comprising:
determining that the first local configuration identifier matches the first configuration identifier;
determining a difference between the first configuration information corresponding to the first configuration identifier and the second configuration information corresponding to the second configuration identifier; and
sending, to the first user plane device of the first network slice, configuration information corresponding to the difference.

7. The method of claim 1, further comprising:
determining fourth configuration information for configuring a second user plane device of a second network slice, wherein the second network slice is different from the first network slice and the fourth configuration information is different from the first configuration information; and
sending, to the second user plane device of the second network slice, the fourth configuration information and a corresponding configuration identifier;
wherein the control plane device is concurrently associated with both the first network slice and the second network slice.

8. The method of claim 1, wherein the first configuration identifier is generated by processing the first configuration information using a hash algorithm.

9. The method of claim 8, wherein the hash algorithm is used by the first user plane device to generate the first local configuration identifier based on the first local configuration information.

10. The method of claim 1, wherein the first configuration identifier sent to the first user plane device is configured to be used by the first user plane device to verify the first configuration information received from the control plane device.

11. The method of claim 1, wherein the control plane device is configured to perform a session management function.

12. The method of claim 1, wherein the first network slice comprises at least one user plane device configured to perform a user plane function.

13. The method of claim 1, wherein the control plane device and the first network slice are associated within a 5G network.

14. One or more computer-readable non-transitory storage media embodying software that is operable when executed by a control plane device to:
determine first configuration information for configuring a first user plane device of a first network slice associated with the control plane device;
generate a first configuration identifier based on the first configuration information;
send, to the first user plane device of the first network slice, the first configuration identifier and the first configuration information;
release an association with the first user plane device;
receive, from the first user plane device, a first request to establish the association, the first request comprising a first local configuration identifier that is generated by the first user plane device based on first local configuration information used for configuring the first user plane device;
determine whether the first user plane device is configured using second configuration information by comparing the first local configuration identifier and a second configuration identifier generated based on the second configuration information, wherein the second configuration information is latest configuration information for the first user plane device;
send, to the first user plane device, a heartbeat request message including the second configuration identifier;
receive, from the first user plane device, a heartbeat response message including a second local configuration identifier that is generated by the first user plane device based on the first local configuration information used for configuring the first user plane device; and
determine whether the first user plane device is configured using the second configuration information by comparing the second local configuration identifier and the second configuration identifier.

15. The media of claim 14, wherein the software is further operable when executed to:
determine that the first local configuration identifier matches the second configuration identifier, wherein the second configuration identifier is identical to the first configuration identifier; and
establish the association with the first user plane device.

16. The media of claim 14, wherein the software is further operable when executed to:
determine that the first local configuration identifier and the second configuration identifier are different, the second configuration identifier being different from and subsequent to the first configuration identifier; and
send, to the first user plane device of the first network slice, the second configuration identifier.

17. The media of claim 16, wherein the software is further operable when executed to:
determine that the first local configuration identifier matches the first configuration identifier;

determine a difference between the first configuration information corresponding to the first configuration identifier and the second configuration information corresponding to the second configuration identifier; and send, to the first user plane device of the first network slice, configuration information corresponding to the difference.

18. A control plane device, comprising:

one or more processors; and one or more computer-readable non-transitory storage media coupled to one or more of the processors and comprising instructions operable when executed by one or more of the processors to cause the control plane device to:

determine first configuration information for configuring a first user plane device of a first network slice associated with the control plane device;

generate a first configuration identifier based on the first configuration information;

send, to the first user plane device of the first network slice, the first configuration identifier and the first configuration information;

release an association with the first user plane device;

receive, from the first user plane device, a first request to establish the association, the first request comprising a first local configuration identifier that is generated by the first user plane device based on first local configuration information used for configuring the first user plane device;

determine whether the first user plane device is configured using second configuration information by comparing the first local configuration identifier and a second configuration identifier generated based on the second configuration information, wherein the second configuration information is latest configuration information for the first user plane device;

send, to the first user plane device, a heartbeat request message including the second configuration identifier;

receive, from the first user plane device, a heartbeat response message including a second local configuration identifier that is generated by the first user plane device based on the first local configuration information used for configuring the first user plane device; and determine whether the first user plane device is configured using the second configuration information by comparing the second local configuration identifier and the second configuration identifier.

19. The control plane device of claim 18, wherein the processors are further operable when executing the instructions to:

determine that the first local configuration identifier matches the second configuration identifier, wherein the second configuration identifier is identical to the first configuration identifier; and establish the association with the first user plane device.

* * * * *